United States Patent Office 3,538,148
Patented Nov. 3, 1970

3,538,148
NOVEL A-NOR STEROIDS
Lucien Nedelec, Clichy-sous-Bois, and Jean-Claude Gasc, Bondy, France, assignors to Roussel-UCLAF, Paris, France, a corporation of France
No Drawing. Filed Aug. 3, 1967, Ser. No. 658,036
Claims priority, application France, Aug. 12, 1966, 73,030; Nov. 10, 1966, 83,283
Int. Cl. C07c 69/78, 49/82
U.S. Cl. 260—476                               5 Claims

ABSTRACT OF THE DISCLOSURE

Novel A-nor-$\Delta^{3,9,11}$-estratriene-2-ones of the formula

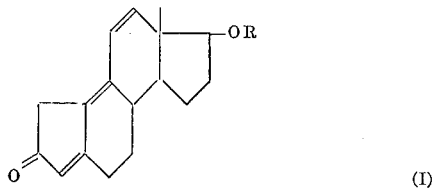

wherein R is selected from the group consisting of hydrogen, acyl of an organic carboxylic acid of 1 to 18 carbon atoms, a tetrahydropyranyl, alkoxymethylene and alkylthiomethylene of 2 to 10 carbon atoms and aralkoxymethylene and aralkylthiomethylene of 7 to 10 carbon atoms which possess anabolic and androgenic activity and their preparation.

PRIOR APPLICATIONS

This application is based on French Convention applications Ser. No. 73,030, filed Aug. 12, 1966 and Ser. No. 83,283, filed Nov. 10, 1966, the priority of which is hereby claimed.

OBJECTS OF THE INVENTION

It is an object of the invention to provide the novel A-nor-$\Delta^{3,9,11}$-estratriene-2-ones of Formula I.

It is another object of the invention to provide novel intermediates and a novel process for the preparation of the A-nor-$\Delta^{3,9,11}$-estratriene-2-ones of Formula I.

It is a further object of the invention to provide novel anabolic an androgenic compositions.

It is an additional object of the invention to provide a novel method of inducing anabolic and androgenic activity in warm-blooded animals.

These and other objects and advantages of the invention will become obvious from the following detailed description.

THE INVENTION

The novel A-nor-$\Delta^{3,9,11}$-estratriene-2-ones of the invention have the formula

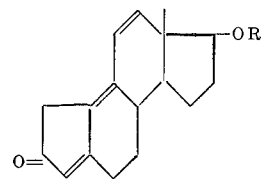

wherein R is selected from the group consisting of hydrogen, acyl of an organic carboxylic acid of 1 to 18 carbon atoms, a tetrahydropyranyl, alkoxymethylene and alkylthiomethylene of 2 to 10 carbon atoms and aralkoxymethylene and aralkylthiomethylene of 7 to 10 carbon atoms.

Examples of suitable organic acids of 1 to 18 carbon atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelargonic acid, capric acid, undecylic acid, lauric acid, myristic acid, palmitic acid and stearic acid; alkenoic acids, such as undecylenic acid and oleic acid, cycloalkyl carboxylic acids, such as cyclopentyl carboxylic acid, cyclopropyl carboxylic acid, cyclobutyl carboxylic acid and cyclohexyl carboxylic acid; cycloalkyl alkanoic acids, such as cyclopentyl acetic acid, cyclohexyl acetic acid, cyclopentyl propionic acid and cycyohexyl propionic acid; arylalkanoic acids, such as phenyl acetic acid and phenyl propionic acid; aryl carboxylic acids, such as benzoic acid and 2,4-dinitrobenzoic acid; phenoxyalkanoic acids, such as phenoxy acetic acid, p-chlorphenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids, such as furane-2-carboxylic acid, 5-terbutylfurane-2-carboxylic acid, 5-bromo-furane-2-carboxylic acid and nicotinic acids; β-ketoalkanoic acids, such as acetylacetic acid, propionylacetic acid and butyrylacetic acid; amino acids, such as diethylaminoacetic acid and aspartic acid.

Examples of suitable ethers of Formula I are 2'-tetrahydropyranyloxy; alkoxymethoxy and alkylthiomethoxy ethers such as methoxy methoxy, propyloxymethoxy, methylthiomethoxy, etc.; and aralkyloxymethoxy and aralkylthiomethoxy such as benzyloxymethoxy, etc.

The A-nor-$\Delta^{3,9,11}$-estratriene-2-ones of Formula I have interesting physiological properties, namely anabolic and androgenic activity. For example, the anabolisant activity of 17β-acetoxy-A-nor-$\Delta^{3,9,11}$-estratriene-2-one is many times greater than that of 19-nor testosterone as determined by the Hershberger (Proc. Soc. Exp. Biol. Med., vol. 83 (1953), p. 175).

The process of the invention for the preparation of the A-nor-$\Delta^{3,9,11}$-estratriene-2-ones of Formula I comprises reacting a 2-chloro-17β-OR$_1$-3,5-seco-A-nor-$\Delta^{2,9}$-estradiene-5-one wherein R$_1$ is the acyl of an organic carboxylic acid of 1 to 7 carbon atoms with an esterification derivative of an organic carboxylic acid of 1 to 6 carbon atoms to form the corresponding 2-chloro-5-acyloxy-17β-OR$_1$-3,5-seco-A-nor-$\Delta^{2,5(10),9(11)}$-estratriene, selectively brominating the latter in the 11-position with bromine in a polar solvent in the presence of an alkali metal acetate and then dehydrobrominating the 11-bromo compound with a lithium halide admixed with an alkali metal or alkaline earth metal carbonate to form 2-chloro-17β-OR$_1$-3,5-seco-A-nor-$^{2,9,11}\Delta$ - estratriene-5-one, reacting the latter under acid conditions to form 17β-OR$_1$-3,5-seco-A-nor-$\Delta^{9,11}$-estradiene-2,5-dione, cyclizing the latter in the presence of an alkali metal alcoholate to form 17β-OR$_1$-A-nor-$\Delta^{3,9,11}$-estratriene-2-one and saponifying the latter under alkaline conditions to form A-nor-$\Delta^{3,9,11}$-estratriene-17β-ol-2-one. The said product can then be esterified in the 17-position by reaction with an esterification derivative of an organic carboxylic acid of 1 to 18 carbon atoms or etherified in the 17-position by reaction with an etherification agent. The reaction is illustrated in the following flow diagram.

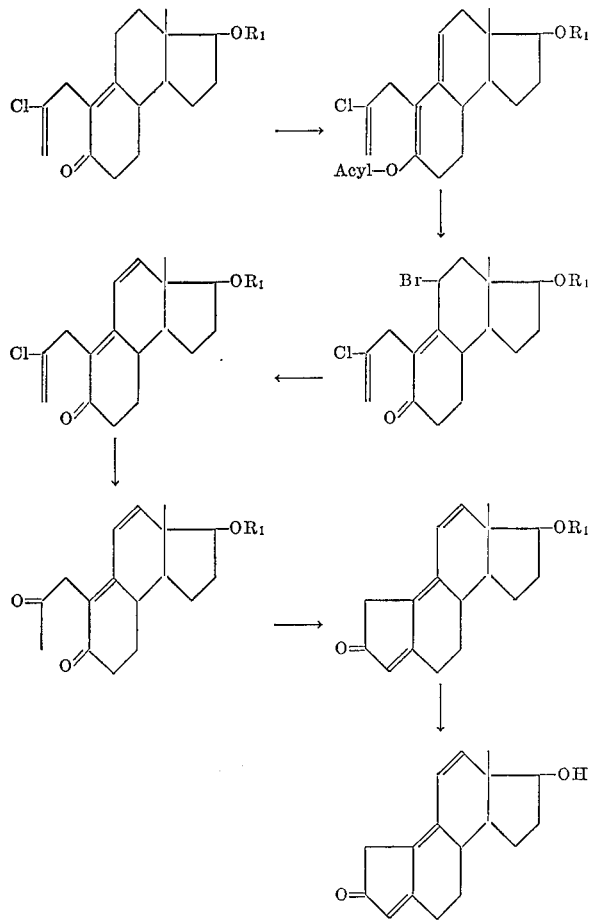

wherein $R_1$ is the acyl radical of an organic carboxylic acid of 1 to 7 carbon atoms and acyl is the acyl radical of a lower alkanoic acid of 1 to 6 carbon atoms.

A preferred mode of the process of the invention comprises reacting 2-chloro-17β-$OR_1$-3,5-seco-A-nor-$\Delta^{2,9}$-estradiene-5-one with acetic acid anhydride in an aprotic solvent such as benzene or toluene in the presence of a strong acid such as p-toluene sulfonic acid to form 2-chloro-5-acetoxy-17β - $OR_1$ - 3,5 - seco-A-nor-$\Delta^{2,5(10),9(11)}$-estratriene, reacting the latter with bromine in a polar solvent such as dimethylformamide or dimethylacetamide in the presence of an alkali metal acetate such as sodium or potassium acetate to form 2-chloro-11-bromo-17β-$OR_1$-3,5-seco-A-nor-$\Delta^{2,9}$-estradiene-5-one, dehydrobrominating the latter with a mixture of a lithium halide such as lithium chloride or lithium bromide and an alkali metal carbonate such as lithium carbonate or an alkaline earth metal carbonate such as calcium carbonate in a polar solvent such as formamide, dimethylformamide or dimethylacetamide to form 2-chloro-17β-$OR_1$-3,5-seco-A-nor-$\Delta^{2,9,11}$-estratriene-5-one, subjecting the latter to the action of a strong acid such as sulfuric acid in an aprotic solvent such as chloroform or methylene chloride to form 17β-$OR_1$-3,5-seco-A-nor-$\Delta^{9,11}$-estradiene-2,5-dione, cyclizing the latter with an alkali metal alcoholate such as potassium tert.-amylate in an aprotic solvent such as benzene or toluene to form 17β-$OR_1$-A-nor-$\Delta^{3,9,11}$-estratriene-2-one, and saponifying the latter under aqueous conditions by reaction with a basic agent such as potassium or sodium hydroxide in a polar solvent such as methanol or ethanol to form A-nor-$\Delta^{3,9,11}$-estratriene-17β-ol-3-one. The etherification is preferably effected in the presence of a basic agent.

Examples of suitable acids for forming the 17β-$OR_1$ of 2-chloro-17β-$OR_1$-3,5-seco - A - nor-$\Delta^{2,9}$-estradiene-5-ones are organic carboxylic acids of 1 to 7 carbon atoms such as acetic acid, propionic acid, benzoic acid, etc. Examples of suitable acids for forming 2-chloro-5-acyloxy-17β-$OR_1$-3,5-seco-A-nor-$\Delta^{2,5(10),9(11)}$-estratriene are lower alkanoic acids of 1 to 6 carbon atoms such as acetic acid, propionic acid, etc.

The novel anabolic and androgenic compositions of the invention are comprised of a safe and effective amount of at least one compound of Formula I and a major amount of a pharmaceutical carrier. The compositions may be in the form of drinkable or injectable solutions or suspensions put up in ampules, in multiple dose flacons, in solutions for transcutaneous usage, implants, tablets, coated tablets, sublingual tablets, capsules, ointments, creams or suppositories prepared in known fashion.

The said compositions are useful for the treatment of disorders of protidic anabolism, asthenia and thinness, of andropause, of senescence, of osteoporosis, of metabolic disturbances due to prolonged cortico therapy, of adiposo-genital syndrome, of fibroma and as complementary treatment of breast cancer and varicose ulcer.

The novel method of the invention of inducing anabolic and androgenic activity in warm-blooded animals comprises administering to warm-blooded animals a safe and effective amount of a compound of Formula I. The said compounds may be administered orally, topically, perlingually, transcutaneously or rectally. The usual useful daily dosage is 0.008 to 0.300 mg./kg. for the adult depending upon the method of administration.

In the following examples there are described several preferred embodiments to illustrate the invention. However, it should be understood that the invention is not intended to be limited to the specific embodiments.

EXAMPLE I

Preparation of A-nor-$\Delta^{3,9,11}$-estratriene-17β-ol-2-one

STEP A.—PREPARATION OF 2-CHLORO - 5 - ACETOXY-17β - BENZOYLOXY - 3,5 - SECO - A - NOR - $\Delta^{2,5(10),9(11)}$-ESTRATRIENE 7.20 gm. of 2-chloro-17β-benzoyloxy-3,5-seco-A-nor-$\Delta^{2,9}$-estradiene-5-one, described in the French Pat. No. 1,479,241, were dissolved in 180 cc. of toluene and then, after 29 cc. of acetic anhydride and 290 mg. of p-toluene sulfonic acid were added thereto, the solution was maintained at reflux for 15 hours under agitation and an atmosphere of nitrogen. Then, the reaction solution was poured into an aqueous saturated solution of sodium bicarbonate and the organic phase was decanted and washed first with an aqueous saturated solution of sodium bicarbonate, then with water, and extracted with toluene. The combined organic phases were dried and evaporated to dryness to obtain 7 gm. of a raw product which was purified by chromatography through silica gel with elution with benzene containing 10% of ethyl acetate and by recrystallization from ethanol to obtain 4.7 gm. of 2-chloro-5-acetoxy-17β-benzoyloxy - 3,5 - seco-A-nor-$\Delta^{2,5(10),9(11)}$-estratriene having a melting point of 107° C. and a specific rotation of $[\alpha]_D^{20} = +112°$ (c.=0.94% in chloroform).

The product occurred in the form of a solid, colorless product which was soluble in ether, benzene and chloroform and insoluble in water.

*Analysis.*—Calculated for $C_{26}H_{29}O_4Cl$ (percent): C, 70.81; H, 6.62; Cl, 8.04. Found (percent): C, 70.6; H, 6.7; Cl, 8.1. Molecular weight=440.95.

Infra-red spectra:
  Presence of benzoate at 1718 cm.$^{-1}$ and 1270 cm.$^{-1}$
  Presence of enolic acetate at 1753 cm.$^{-1}$, 1209 cm.$^{-1}$ and 1194 cm.$^{-1}$
  Presence of C=C at 1654 cm.$^{-1}$ and 1633 cm.$^{-1}$.

Ultra-violet spectra (in ethanol):
  $\lambda_{max.}$ at 232–233 m$\mu$—$\epsilon$=29,100
  infl. toward 271–272 m$\mu$—$\epsilon$=1,450
  $\lambda_{max.}$ at 281 m$\mu$—$\epsilon$=970

This compound is not described in the literature.

STEP B.—PREPARATION OF 2-CHLORO-17$\beta$-BENZOYLOXY-3,5-SECO-A-NOR-$\Delta^{2,9,11}$-ESTRATRIENE-5-ONE (a) *Bromination.*—23.6 gm. of 2-chloro-5-acetoxy-17$\beta$-benzoyloxy-3,5-seco-A-nor-$\Delta^{2,5(10),9(11)}$-estratriene and 16.2 gm. of sodium acetate were suspended in 236 cc. of dimethylformamide and then 96 cc. of a 10% bromine solution in dimethylformamide were added slowly at room temperature to the dimethylformamide suspension and the mixture was agitated for a period of 15 hours, after which the reaction mixture was poured into a water-ice-methylene chloride mixture. The organic phase was separated, washed with an aqueous saturated solution of sodium bicarbonate and extracted with methylene chloride. Then the combined organic phases were dried and evaporated to dryness in vacuo to obtain 30 gm. of 2-chloro-11-bromo-17$\beta$-benzoyloxy-A-nor-3,5-seco-$\Delta^{2,9}$-estradiene-5-one.

This compound is not described in the literature.

(b) *Dehydrobromination.*—24 gm. of lithium bromide and 24 gm. of lithium carbonate were suspended in 250 cc. of dimethylformamide at a temperature of 100° C., and 30 gm. of the brominated derivative obtained in (a) were added thereto. The mixture was agitated at 100° C. for 21 hours, then cooled to 20° C. and poured into a water-ice-acetic acid mixture. The reaction mixture was then extracted with isopropyl ether and the organic phase was separated, washed first with an aqueous saturated solution of sodium bicarbonate and then with water until the wash waters were neutral, and evaporated to dryness to obtain 25 gm. of a raw product which was purified by chromatography through silica gel, with elution with benzene containing 10% of ethyl acetate and finally by recrystallization from isopropyl ether to obtain 11 gm. of 2-chloro-17$\beta$-benzoyloxy-3,5-seco-A-nor-$\Delta^{2,9,11}$-estratriene-5-one having a melting point of 120° C. and a specific rotation of $[\alpha]_D^{20}$=—39° (c.=0.95% in chloroform).

The product occurred in the form of small colorless rods which were soluble in alcohol and chloroform and insoluble in water.

*Analysis.*—Calculated for $C_{24}H_{25}O_3Cl$ (percent): C, 72.62; H, 6.35; Cl, 8.93. Found (percent): C, 72.6; H, 6.2; Cl, 8.8. Molecular weight=396.90.

Ultra-violet spectra (in ethanol):
  $\lambda_{max.}$ at 230 m$\mu$—$\epsilon$=14,100
  $\lambda_{max.}$ at 286 m$\mu$—$\epsilon$=26,900
Infra-red spectra:
  Presence of benzoate at 1723 cm.$^{-1}$ and 1272 cm.$^{-1}$
  Presence of conjugated ketone at 1666 cm.$^{-1}$
  Presence of C=C at 1633 cm.$^{-1}$
  Presence of =CH at 875 cm.$^{-1}$ This compound is not described in the literature.

STEP C.—PREPARATION OF 17$\beta$-BENZOYLOXY-3,5-SECO-A-NOR-$\Delta^{9,11}$-ESTRADIENE-2,5-DIONE 12 gm. of 2-chloro-17$\beta$-benzoyloxy-3,5-seco-A-nor-$\Delta^{2,9,11}$-estratriene-5-one were dissolved in 60 cc. of methylene chloride and after the temperature was lowered to —10° C., 60 cc. of 66° Bé. sulfuric acid were added thereto. The mixture was agitated for 5 minutes at —10° C., and then 250 cc. of water were added within a space of 20 minutes while maintaining the temperature at about —10° C. Then the reaction mixture was extracted with ether and the combined organic phases were washed first with water, then with an aqueous saturated solution of sodium bicarbonate and again with water. 400 cc. of methylene chloride were added to the ether phase and the solution dried over sodium sulfate and evaporated to dryness in vacuo to obtain 12.6 gm. of a raw product, which product was purified by chromatography through silica gel with elution with a benzene-ethyl acetate mixture (7:3), followed by trituration in isopropyl ether and finally by recrystallization from methanol to obtain 17$\beta$-benzoyloxy-3,5-seco-A-nor-$\Delta^{9,11}$-estradiene-2,5-dione having a melting point of 156° C. and a specific rotation of $[\alpha]_D^{20}$=—63° (c.=0.66% in methanol).

The product occurred in the form of colorless crystals which were slightly soluble in isopropyl ether and insoluble in water.

*Analysis.*—Calculated for $C_{24}H_{26}O_4$ (percent): C, 76.16; H, 6.92. Found (percent): C 75.9; H, 7.0. Molecular weight=378.45.

Ultra-violet spectra (in ethanol):
  $\lambda_{max.}$ at 230 m$\mu$—$\epsilon$=14,700
  $\lambda_{max.}$ at 287–288 m$\mu$—$\epsilon$=24,800

This compound is not described in the literature.

STEP D.—PREPARATION OF A-NOR-$\Delta^{3,9,11}$-ESTRATRIENE-17$\beta$-OL-2-ONE (a) *Cyclization.*—3.6 gm. of 17$\beta$-benzoyloxy-3,5-seco-A-nor-$\Delta^{9,11}$-estradiene-2,5-dione were heated at a temperature of 82° C., and under agitation and an atmosphere of nitrogen in 36 cc. of toluene. Then, 9.5 cc. of a 1 N solution of potassium tert.-amylate in toluene and 36 cc. of toluene were added thereto. The mixture was agitated for 45 minutes at a maintained temperature of 83° C.±2° C. after which the reaction mixture was neutralized with a solution of 1 cc. of acetic acid in 9 cc. of toluene and cooled. The organic phase was separated, washed with water until the wash waters were neutral, and extracted with toluene. The extracts were evaporated to obtain 3.7 gm. of 17$\beta$-benzyloxy-A-nor-$\Delta^{3,9,11}$-estratriene-2-one which was used as such for the saponification. Purified by a thin layer of chromatography, the product had a melting point of 135° C.

This product is not described in the literature.

(b) *Saponification.*—3.7 gm. of the raw product obtained in step (a) were dissolved at reflux and under an atmosphere of nitrogen in 60 cc. of methanol. After cooling the solution, 3 cc. of a 48° Bé. potassium hydroxide solution were added, and the solution was agitated at reflux for 20 minutes, always maintaining an atmosphere of inert gas. Then, the reaction mixture was cooled, poured into a water-ice mixture and extracted with methylene chloride. The organic phases were washed with water until the wash waters were neutral, dried and evaporated to dryness to obtain 2.7 gm. of a raw product which was purified first by chromatography through silica gel with elution with chloroform containing 10% of acetone and recrystallization from ethanol to obtain A-nor-$\Delta^{3,9,11}$-estratriene-17$\beta$-ol-2-one having a melting point of 236° C.

The product occurred in the form of a solid, colorless product which was slightly soluble in alcohol and chloroform and insoluble in water.

Ultra-violet spectra:
  $\lambda_{max.}$ at 240 m$\mu$—$\epsilon$=7,550
  infl. towards 245 m$\mu$—$\epsilon$=7,050
  $\lambda_{max.}$ at 261 m$\mu$—$\epsilon$=5,000
  $\lambda_{max.}$ at 275 m$\mu$—$\epsilon$=5,350
  $\lambda_{max.}$ at 332 m$\mu$—$\epsilon$=26,900

This compound is not described in the literature.

EXAMPLE II

Preparation of 17$\beta$-acetoxy-A-nor-$\Delta^{3,9,11}$-estratriene-2-one 1 gm. of A-nor-$\Delta^{3,9,11}$-estratriene-17$\beta$-ol-2-one was dissolved in 8 cc. of pyridine and 4 cc. of acetic anhydride and the solution was agitated for 3 hours and 30 minutes at room temperature. Then, the reaction solution was poured into a water-ice mixture, extracted with methylene chloride, and the combined organic phases were evaporated to dryness to obtain 1.2 gm. of a raw product. The said product was then purified by chromatography through silica gel with elution with chloroform containing 5% of acetone to obtain 1 gm. of 17β-acetoxy-A-nor-$\Delta^{3,9,11}$-estratriene-2-one having a melting point of 150° C. and a specific rotation of $[\alpha]_D^{20} = -41°$ (c.=0.7% in chloroform).

*Analysis.*—Calculated for $C_{19}H_{22}O_3$ (percent): C, 76.47; H, 7.43. Found (percent): C, 76.2; H, 7.4. Molecular weight=298.37.

Ultra-violet spectra:
  infl. towards 234 mμ—ε=7,250
  max. at 238–239 mμ—ε=7,550
  infl. towards 244–245 mμ—ε=6,850
  infl. towards 263–264 mμ—ε=4,800
  infl. towards 275 mμ—ε=5,500
  max. at 329–330 mμ—ε=26,900

Infra-red spectra:
  Presence of acetate at 1730 cm.$^{-1}$ and 1250 cm.$^{-1}$
  Presence of conjugated system at 1698 cm.$^{-1}$, 1673 cm.$^{-1}$, 1623 cm.$^{-1}$, 1577 cm.$^{-1}$.

This compound is not described in the literature.

EXAMPLE III

Preparation of 17β-(methoxymethoxy)-A-nor-$\Delta^{3,9,11}$-estratriene-2-one 1 gm. of A-nor-$\Delta^{3,9,11}$-estratriene-17β-ol-2-one was introduced under an atmosphere of nitrogen into 15 cc. of dimethylformamide. Then first 0.9 cc. of methoxychloromethane and then 0.400 gm. of lithium carbonate were added thereto and the mixture was kept under agitation. A further addition of 0.9 cc. of methoxychloromethane and 0.400 gm. of lithium carbonate was effected after 1 hour, 2 hours and 3 hours of reaction, respectively. Two hours after the last introduction of reagent (at the end of 5 hours of reaction) the reaction mixture was poured into an aqueous solution of sodium bicarbonate. The aqueous phase was extracted with methylene chloride and the methylene chloride extracts were combined, washed with water, dried over sodium sulfate and concentrated to dryness under reduced presure. The resultant residue was purified by repeated chromatography through silica gel to obtain 17β - (methoxymethoxy) - A - nor - $\Delta^{3,9,11}$estratriene-2-one.

This product is not described in the literature.

PHARMACOLOGICAL DATA

Anabolisant and androgenic activity

The anabolisant and androgenic activity of 17β-acetoxy-A-nor-$\Delta^{3,9,11}$-estratriene-2-one was determined according to the slightly modified technique of Hershberger (Proc. Soc. Exp. Biol. Med., 1953, 83, 175). The test was conducted on castrated male rats 3½ weeks old. Beginning on the day after castration, the rats received the test compounds for 10 days daily with the exception of the 6th day. They were sacrificed on the 11th day 22–26 hours after the last administration. An autopsy was conducted on each animal, and the levator ani for the study of the anabolisant action, and the prostate gland and seminal vescicles for the study of the androgenic effect, were removed and weighed.

17β-acetoxy-A-nor-$\Delta^{3,9,11}$-estratriene-2-one in a solution of olive oil admixed with 5% benzyl alcohol was administered subcutaneously at a dose of $$100\gamma \times \frac{10}{9}$$

(total dose of 1000γ, divided into 9 administrations over 10 days). The results obtained are summarized in the following table and are presented by way of comparison with the results obtained with 19-nor-testosterone acetate administered at the same dose.

| Lots | Daily dose | Fresh levator ani, mg. | Seminal vesicles, mg. | Prostate gland, mg. |
|---|---|---|---|---|
| Controls | 0 | 25.7 | 3.5 | 6.0 |
| 17β-acetoxy-A-nor-$\Delta^{3,9,11}$-estratriene-2-one | $\frac{100\gamma \times 10}{9}$ | 72.6 | 74.3 | 75.9 |
| Controls | 0 | 21.4 | 7.6 | 10.3 |
| 19-nor testosterone acetate | $\frac{100\gamma \times 10}{9}$ | 51.3 | 27.1 | 34.3 |

These results show that 17β-acetoxy - A - nor-$\Delta^{3,9,11}$-estratriene-2-one, when administered subcutaneously possesses an anbolisant and androgenic activity distinctly superior to that of 19-nor-testosterone acetate.

17β-acetoxy-A-nor-$\Delta^{3,9,11}$-estratriene - 2 - one was also studied according to a closely related technique to the Hershberger test comprising only 5 treatments. The said compound proved to be active at a dose of 200γ when given orally, and at a dose of 20γ when given subcutaneously.

Various modifications of the compositions and methods of the invention may be made without departing from the spirit or scope thereof and it is to be understood that the invention is to be limited only as defined in the appended claims.

We claim:
1. An A-nor-$\Delta^{3,9,11}$-estratriene-2-one of the formula

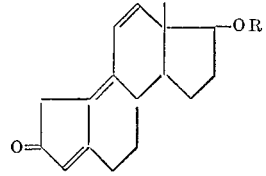

wherein R is selected from the group consisting of hydrogen, acyl of an organic carboxylic acid of 1 to 18 carbon atoms, a tetrahydropyranyl, alkoxymethylene and alkylthiomethylene of 2 to 10 carbon atoms and aralkoxymethylene and aralkylthiomethylene of 7 to 10 carbon atoms.

2. A compound of claim 1 which is 17β-acetoxy-A-nor-$\Delta^{3,9,11}$-estratriene-2-one.

3. A compound of claim 1 which is A-nor-$\Delta^{3,9,11}$-estratriene-17β-ol-2-one.

4. A compound of claim 1 which is 17β-benzoyloxy-A-nor-$\Delta^{3,9,11}$-estratriene-2-one.

5. A compound of claim 1 which is 17β-(methoxymethoxy)-A-nor-$\Delta^{3,9,11}$-estratriene-2-one.

References Cited

UNITED STATES PATENTS 3,248,294   4/1966   Nominé _____ 167—74

OTHER REFERENCES

Nominé et al.: Compete Rendos Acad. Sc., Paris, vol. 264, Apr. 17, 1967, pp. 1395–1401.

LORRAINE A. WEINBERGER, Primary Examiner

E. J. GLEIMAN, Assistant Examiner

U.S. Cl. X.R.

260—295.5, 345.9, 347.5, 410, 468, 471, 473, 482, 483, 488, 586, 590; 424—283, 308, 311, 331